Oct. 9, 1962 W. A. SCHENCK 3,057,771
RIBBED BATTERY SEPARATOR PAPER AND METHOD
AND APPARATUS FOR MAKING THE SAME
Filed Nov. 7, 1958
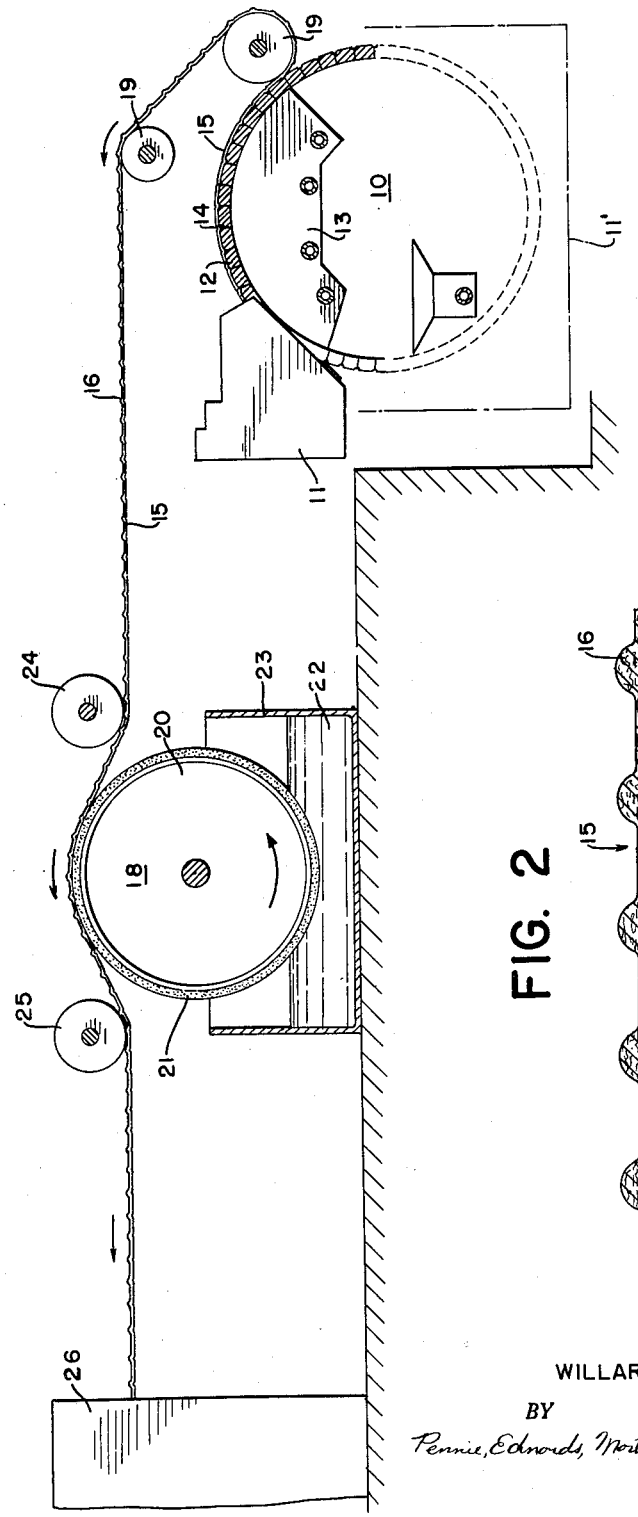
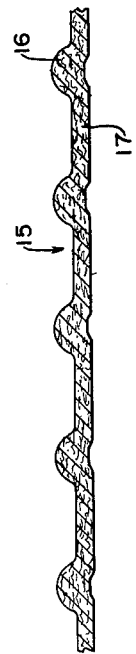
*INVENTOR.*
WILLARD ALLAN SCHENCK
BY
Pennie, Edmonds, Morton, Barrows & Taylor
ATTORNEYS

United States Patent Office 3,057,771
Patented Oct. 9, 1962

3,057,771
RIBBED BATTERY SEPARATOR PAPER AND METHOD AND APPARATUS FOR MAKING THE SAME
Willard Allan Schenck, Finesville, N.J., assignor to Riegel Paper Corporation, New York, N.Y., a corporation of Delaware
Filed Nov. 7, 1958, Ser. No. 772,472
13 Claims. (Cl. 162—116)

The present invention relates to papers used for battery plate separators, for example, and more particularly to an improved resin-impregnated, ribbed, separator paper, and to an improved method and means for making the new paper.

In the manufacture of multi-plate storage batteries, it is conventional to utilize porous, low resistance paper separators between the plates of the battery, to prevent contact between the plates and/or deposits formed thereon, while permitting the passage of electrolyte and the flow of electrical current. Conventionally, separators are formed of paper web material, which is impregnated with a suitable resin. The resin is cured and hardened in a press, which is also used to form ribs in the otherwise flat paper web, so that the finished separators are relatively hard and have ribs to provide for better battery acid circulation and gas escape and for greater effective thickness. Alternatively ribs have been formed in the resin impregnated web material by ribforming rolls and the resin subsequently cured by the passing of the ribbed material through suitable ovens.

In the past, ribbed, impregnated separators have not been wholly satisfactory, due to the fact that the web material is stressed and weakened when the ribs are formed therein. That is, when portions of the initially flat web are deformed sufficiently to form ribs, the material is stretched, and thereby made thinner, and the stresses appear to be concentrated at the ribs. Accordingly, when the batteries are subjected to severe service, in which substantial forces are applied to the separators, the separators may break along the ribs.

It has been proposed, heretofore, to obviate the weakening effect of conventional rib forming by subsequently coating the ribs with additional resin. Such coating of the ribs has also been employed to improve their oxidation resistance. However, such procedure involves additional manufacturing expense and is otherwise not entirely satisfactory.

Accordingly, the present invention provides an improved separator paper, and an improved method and means of making it, in which ribs are formed in the paper in such a manner as to be wholly free of concentrated stresses. More specifically, in the new paper, the ribs have more base material, per unit of web length, than the web areas between the ribs, so that the rib structure of the new paper materially strengthens the web.

In accordance with one aspect of the invention, the new paper is formed by flowing paper stock onto a forming surface having a plurality of spaced grooves. The stock flows into the grooves and forms ribs of greater thickness than the connecting web areas, and the web is subsequently handled in such a way that the ribs are not deformed or otherwise damaged. The web thus formed is impregnated with resin (either before or after an initial drying of the web—if before the impregnation may be termed "wet web" impregnation whereas if after may be termed "dry web" impregnation) and is then dried, whether "wet" or "dry" web impregnated to place it in condition for shipment or further treatment. Alternatively, resin may be added prior to formation of the web, and this is advantageously accomplished by adding resin at the time the web-forming stock is beaten, a suitable precipitator being added to the stock at an appropriate time so that the resin is deposited properly on the fibers of the stock. In the alternative method, the web may be dried immediately after its formation, without further impregnation, although additional resin may be added where desirable or expedient.

After drying, the web may be cut to appropriate size and cured, in accordance with usual practice, by either the paper maker or the user. The resulting separators, formed with the new paper, have materially improved rib strength without significant sacrifice of conductivity, porosity and other desirable characteristics.

For a better understanding of the invention, reference should be made to the accompanying drawing, in which:

FIG. 1 is a simplified representation of an apparatus incorporating features of the invention, for carrying out the new method; and FIG. 2 is an enlarged, fragmentary, cross-sectional view of the product of the invention.

Referring now to the drawing, and initially to FIG. 1 thereof, the reference numeral 10 designates, generally, a paper making machine, which may be a cylinder machine of the general type shown in U.S. Patent No. 2,484,047, for example. The illustrated paper machine 10 comprises a reservoir 11 for maintaining a supply of paper stock, and a forming cylinder 12 which rotates (clockwise in FIG. 1) to provide a continuously moving surface at the outlet of the reservoir. Suitable suction means 13 are provided inside the forming cylinder to draw water through the forming surface, to form a paper web, in accordance with usual practice. By way of further example, the paper machine 10 may be of the type in which the forming cylinder 12 rotates through a tank or vat of stock, such as illustrated in phantom at 11'. Suction means within the cylinder cause a web to be formed on the cylinder surface as it moves through the stock, and the upper portion of the cylinder is exposed so that web may be removed therefrom.

The paper stock supplied to the reservoir 11 may advantageously be in substantial accord with, for example, the teachings of the co-pending Borden, Jr., et al. application, Ser. No. 589,851, filed June 5, 1956, for "Battery Separator." In this respect, the stock advantageously comprises cotton linters having a small fiber width (e.g., 20 microns) and so constituted that, when formed into a sheet and impregnated with a suitable resin, it will have a low ohmic resistance (e.g., not substantially greater than $0.03\%_{46}$ ohm per square inch per mil of thickness) and a high porosity (e.g., less than 4 seconds, Gurly Densometer).

The surface on which the web is formed is provided with a plurality of spaced grooves or recesses 14, the number, dimensions, spacing and orientation of which may be varied to suit. The recesses 14 usually extend transversely of the web but need not be continuous or extend from one edge to the other.

In accordance with one aspect of the invention, the paper stock is flowed onto or applied to the forming surface of the cylinder 12 in a manner such that the formed web follows the contours of the recesses 14. And, advantageously, the web forming material fills the recesses 14, so that the paper web 15 thereby formed is substantially like that illustrated in FIG. 2. Thus, spaced along the web 15 are projecting ribs 16, having the shape and dimensions of the recesses 14, and between the ribs 16 are connecting web sections 17 of relatively uniform thickness. Accordingly, and as one of the important features of the invention, the portions of the web 15 which include the ribs 16 have a greater amount of fibrous material, per unit of web length, than the connecting web sections 17.

In the method illustrated in FIG. 1 the web 15 leaving the forming machine 10 is conveyed directly to a station 18, where the web, while still in a wet condition, is impregnated with a suitable resin, such as a thermosetting phenol formaldehyde resin. In the illustrated apparatus, the web 15 leaving the forming cylinder 12 is passed about an idler roll 19, which reverses the direction of the web and orients the ribs 16 to project upward rather than downward. After the web passes over the idling roller 19, it is brought into contact with the upper surface portion of an impregnating cylinder 20. The cylinder 20, which is advantageously driven to have a peripheral speed corresponding to that of the web, is provided with an outer covering 21 of felt or other absorbent material, which contacts the lower or flat side of the web.

In the illustrated apparatus, the lower portion of the impregnating cylinder 20 is immersed in a supply 22 of liquid impregnating solution maintained in a suitable reservoir 23. Thus, as the cylinder 20 rotates, portions of its absorbent outer covering 21 are moved continuously through the solution 22 and then brought into contact with the web 15. The nature of the impregnating solution is such that a portion thereof is absorbed by the web material to impregnate the web in the manner desired.

The amount of impregnating solution absorbed by the web 15 is determined in part by the length of the period in which the web is in contact with the cylinder covering 21. Accordingly, it may be advantageous to provide idler rolls 24, 25, which are positioned on opposite sides of the impregnating cylinder 20 and are arranged to have their lower surfaces below the upper surface of the cylinder. The web 15 is caused to pass below the rollers 24, 25 and over the cylinder 20, whereby the web contacts the cylinder covering 21 over a substantial arc. If desired, the rolls 24, 25 may be adjustably positioned, so that the period of impregnating contact may be varied. However, it will be understood that the rolls 24, 25 should be spaced at least a short distance from the surface of the cylinder 20 to avoid the application of pressure between the opposite surfaces of the web 15 to flatten or deform the ribs 16 thereof.

In an alternative method of the invention, the step of impregnating with resin after formation of the web may be omitted by adding the resin to the web-forming stock. The resin may be added during beating of the stock, and suitable agents are introduced, prior to web formation, to cause the resin to precipitate onto the fibers of the stock.

Where desirable or expedient, resin may be introduced both before and after web formation, such as by introducing a portion of the desired amount in the beater and later impregnating the formed web with additional resin. Also, as suggested previously, the ribbed web after formation (with or without resin in it) may be dried and then subsequently whenever convenient "dry web" impregnated with resin. The specific procedure to be followed may thus be varied somewhat to accommodate the producing facilities of the manufacturer, as well as the specifications of the product.

After the web leaves the impregnating station 18 (or the paper machine 10, in cases where the resin is introduced prior to web formation and the impregnating step is omitted), it is conveyed to a drier 26, where moisture is removed from the web and a partial curing of the resin may take place. Advantageously, the drier 26 is a tunnel drier, having an elongated passage through which the web 15 may pass in the absence of the application thereto of pressures which might deform the ribs 16.

The dried web is in a handleable condition and may be further processed in a generally conventional manner. Thus, the webs may be cut into elements of suitable size and shape for use as battery separators, and the resin is fully cured to impart the desired characteristics to the separators.

In some cases it may be desirable to provide the ribs 16 of the dried web with an additional coating of resin material. However, it will be understood that the present invention effectively eliminates the need for such further coating, unless extraordinary strength or other special characteristics are sought.

The present invention provides a substantially improved battery separator paper, in that the ribs formed in the web are wholly free of concentrated stress and may even be the strongest portions of the web. By way of contrast, battery separators manufactured in accordance with known methods are characterized by weak rib areas, in which the web material is thinner than elsewhere and which have substantial stress concentrations formed during the deformation of the flat web. In the new method, a web is initially formed with ribs projecting from one surface thereof, and the web is subsequently handled in a manner such that impregnating and drying may be carried out without deforming the ribs. As initially formed, the rib areas of the web have a greater fiber content per unit of web length than the connecting web areas, which imparts great strength to the critical areas of the web.

The invention is also advantageous in that, while it results in a product of improved characteristics, it also eliminates a manufacturing step heretofore required to coat the ribs of the web with additional resin. Thus, while the web material of the invention may be rib coated, if desired, to impart special strength or other characteristics thereto, rib coating has been a necessary step, heretofore, to give the web sufficient physical strength or chemical resistance for normal usage.

It should be understood that the foregoing specific description is intended to be representative only, as many changes may be made therein without departing from the clear teachings of the invention. Thus, the improved ribbed web material may be manufactured with a variety of apparatus and may take several specific forms. Accordingly, reference should be made to the following appended claims in determining the full scope of the invention.

I claim:

1. The method of making ribbed, resin impregnated, battery separator paper for use in making ribbed battery separators, which comprises forming a paper web from battery separator paper stock by causing the stock to be laid on a forming surface having a plurality of grooves therein, the stock being laid on the forming surface in sufficient thickness substantially to fill the grooves and form connecting web areas between the grooves, removing the formed web from the forming surface, impregnating the web with resin, and drying and curing the resin impregnated web, the web thus formed having two principal opposite surfaces and having ribs on one of said surfaces.

2. The method of claim 1, in which the impregnating and curing steps are carried out while maintaining said web free of substantial pressure between its principal surfaces.

3. The method of claim 1, in which the impregnating and curing steps are carried out while maintaining said web free of substantial pressure localized on the ribs of the web.

4. The method of claim 1, in which the web is impregnated with resin substantially immediately following formation and before drying thereof.

5. The method of making ribbed, resin impregnated, battery separator paper for use in making ribbed battery separators, which comprises forming a paper web from battery separator paper stock by causing the stock to be laid on a forming surface having a plurality of grooves therein, one surface of the web, as formed, following the contours of the grooves, removing the formed web from the forming surface, imparting resin to the web material, and drying the web.

6. The method of claim 5, in which resin is added to the web forming material before the stock is laid on the forming surface.

7. The method of claim 5, in which resin is imparted to the web material by impregnating the formed web.

8. The method of claim 5, in which resin is added to the web forming material before the stock is laid on the forming surface, and the formed web is impregnated with additional resin before drying.

9. The method of claim 5, in which the stock is laid on the forming surface in sufficient thickness substantially to fill the grooves therein.

10. As a new product of manufacture, a ribbed, resin impregnated battery separator paper made in accordance with the method of claim 5.

11. Apparatus for forming ribbed, resin impregnated, battery separator paper for use in making ribbed battery separators, which comprises a web forming means including means for holding a supply of web-forming battery separator paper stock and a web forming surface having a plurality of grooves therein adapted to form ribs on one side of the web, means mounted for substantially continuous engagement with the web on the side thereof opposite said one side for impregnating the web material with a resin while maintaining said web material free of substantial pressure localized on the ribs of the web, and means for drying the resin impregnated web.

12. The apparatus of claim 11, in which the impregnating means comprises an impregnating cylinder having one portion of its surface immersed in resin solution and having another portion of its surface in contacting relation to the web.

13. The apparatus of claim 12, in which the web passes over an upper surface portion of the impregnating cylinder, the web is formed with ribs projecting in a generally downward direction, and means are provided for reorienting the web between the forming surface and the impregnating cylinder whereby the ribs project generally upward during the period in which the web is in contact with the impregnating cylinder.

References Cited in the file of this patent

UNITED STATES PATENTS

| | | |
|---|---|---|
| 2,015,416 | Toohey et al. | Sept. 24, 1935 |
| 2,662,106 | Uhlig et al. | Dec. 8, 1953 |
| 2,668,786 | Perry | Feb. 9, 1954 |
| 2,680,996 | Brown | June 15, 1954 |
| 2,882,331 | Zenczak | Apr. 14, 1959 |

FOREIGN PATENTS

| | | |
|---|---|---|
| 772,172 | Great Britain | Apr. 10, 1957 |